United States Patent
Gao et al.

(10) Patent No.: US 12,555,831 B2
(45) Date of Patent: Feb. 17, 2026

(54) POWER CABINET

(71) Applicant: BYD COMPANY LIMITED, Shenzhen (CN)

(72) Inventors: Yunjie Gao, Shenzhen (CN); Yaozhong Mi, Shenzhen (CN); Hongli Wang, Shenzhen (CN); Minghai Lv, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/493,340

(22) Filed: Oct. 24, 2023

(65) Prior Publication Data
US 2024/0072313 A1    Feb. 29, 2024

Related U.S. Application Data

(63) Continuation of application No. 16/335,720, filed as application No. PCT/CN2017/102193 on Sep. 19, 2017, now abandoned.

(30) Foreign Application Priority Data

Sep. 30, 2016    (CN) .......................... 201621101707.2

(51) Int. Cl.
*H01M 10/42*    (2006.01)
*H01M 50/209*    (2021.01)
(Continued)

(52) U.S. Cl.
CPC ....... *H01M 10/425* (2013.01); *H01M 50/209* (2021.01); *H01M 50/251* (2021.01);
(Continued)

(58) Field of Classification Search
CPC .......................... H01M 50/20; H01M 50/502
See application file for complete search history.

(56) References Cited

U.S. PATENT DOCUMENTS 6,027,828 A    2/2000    Hahn
6,126,492 A    10/2000    Amberg et al.
(Continued)

FOREIGN PATENT DOCUMENTS

CN    101322263 B    6/2010
CN    201975443 U    9/2011
(Continued)

OTHER PUBLICATIONS

The World Intellectual Property Organization (WIPO) International Search Report for PCT/CN2017/102193 Dec. 25, 2017 5 Pages.

*Primary Examiner* — Maria Laios
*Assistant Examiner* — Jordan E Berresford
(74) *Attorney, Agent, or Firm* — Wenye Tan (57) ABSTRACT

This disclosure provides a power cabinet. The power cabinet includes M modules, N plug-in components, and N locking apparatuses. The M modules are sequentially stacked from top to bottom. The N plug-in components are configured to lead out a power line and/or a signal line. A $p^{th}$ module and a $(p+1)^{th}$ module are electrically connected by using a $p^{th}$ plug-in component, the $p^{th}$ module and the $(p+1)^{th}$ module are connected by using a $p^{th}$ locking apparatus, M, N, and p are all integers, M≥3, N=M−1, 1≤p≤M−1, at least one of the M modules is a battery management module, and remaining modules of the M modules are battery modules.

8 Claims, 4 Drawing Sheets

(51) Int. Cl.
*H01M 50/251* (2021.01)
*H01M 50/264* (2021.01)
*H01M 50/503* (2021.01)

(52) U.S. Cl.
CPC ....... *H01M 50/264* (2021.01); *H01M 50/503* (2021.01); *H01M 2010/4271* (2013.01); *H01M 2220/10* (2013.01)

(56) References Cited

U.S. PATENT DOCUMENTS

| | | | |
|---|---|---|---|
| 6,310,783 B1 * | 10/2001 | Winch | H02J 7/0029 361/679.48 |
| 9,159,974 B2 | 10/2015 | Kwag et al. | |
| 9,209,433 B2 | 12/2015 | Kukel et al. | |
| 2011/0273132 A1 | 11/2011 | Yashraj et al. | |
| 2013/0162210 A1 | 6/2013 | Tang et al. | |
| 2014/0160686 A1 | 6/2014 | Benson et al. | |
| 2015/0318522 A1 | 11/2015 | Kim et al. | |

FOREIGN PATENT DOCUMENTS

| | | | | |
|---|---|---|---|---|
| CN | 202435073 U | 9/2012 | | |
| CN | 102870252 A | 1/2013 | | |
| CN | 102938449 A | 2/2013 | | |
| CN | 103367686 A | 10/2013 | | |
| CN | 204012913 U | 12/2014 | | |
| CN | 104701399 A | 6/2015 | | |
| CN | 105226211 A | 1/2016 | | |
| CN | 205248342 U | 5/2016 | | |
| CN | 206099077 U | 4/2017 | | |
| EP | 1624506 A1 * | 2/2006 | .......... | H01M 2/1077 |
| EP | 2429015 A1 | 3/2012 | | |
| JP | 2000357877 A | 12/2000 | | |
| JP | 2001258442 A | 9/2001 | | |
| JP | 2014230360 A | 12/2014 | | |
| JP | 5750097 B2 | 7/2015 | | |
| JP | 2015127993 A | 7/2015 | | |
| KR | 20130052919 A | 5/2013 | | |
| KR | 20140134886 A | 11/2014 | | |
| WO | 2011108680 A1 | 6/2013 | | |

* cited by examiner

POWER CABINET

CROSS-REFERENCE TO RELATED APPLICATIONS

This application is a continuation of U.S. patent application Ser. No. 16/335,720, filed on Mar. 22, 2019, which a national phase entry under 35 U.S.C. § 371 of International Application No. PCT/CN2017/102193, filed on Sep. 19, 2017, which claims priority to Chinese Patent Application No. 201621101707.2, filed on Sep. 30, 2016, all of which are incorporated by reference in entirety.

BACKGROUND

Technical Field

This disclosure relates to system cabinets, and in particular, to a power cabinet.

Related Art

Power cabinets, as backup power supply systems or electricity recycle systems, are widely applied in many electrical fields.

An existing power cabinet generally includes a cabinet body having a housing and a battery module installed or fixed in the cabinet body. When the power cabinet is produced, the cabinet body is first produced, and then the battery module is inserted into the cabinet body in a manner of pulling a drawer, for installation and fixing. In the foregoing solution, in one aspect, the battery module needs to be pushed into the cabinet body, and is then fixed in another manner such as by using a screw. This increases installation procedures and manual costs in an installation process. In another aspect, cable wiring in the cabinet body is messed up. Besides, cables and the cabinet body are customized according to a quantity of battery modules, which is unhelpful for extension and is inflexible in usage. In addition, production of the cabinet body also requires costs and time.

SUMMARY

This disclosure aims to resolve at least one of the foregoing technical problems to some extent, and provides a power cabinet having a simple installation procedure, low costs, and tidy wiring.

In view of this, this disclosure provides a power cabinet, including: M modules, where the M modules are sequentially stacked from top to bottom; N plug-in components, configured to lead out a power line and/or a signal line; and N locking apparatuses, where a $p^{th}$ module and a $(p+1)^{th}$ module are electrically connected by using a $p^{th}$ plug-in component, the $p^{th}$ module and the $(p+1)^{th}$ module are connected by using a $p^{th}$ locking apparatus, M, N, and p are all integers, $M \geq 3$, $N=M-1$, $1 \leq p \leq M-1$, at least one of the M modules is a battery management module, and remaining modules of the M modules are battery modules.

In the power cabinet provided in this disclosure, a cabinet body of a traditional power cabinet does not need to be customized, the M modules are directly stacked from top to bottom to form the cabinet body, the N locking apparatuses are used to assemble and fix the modules, a battery module does not need to be installed and fixed in the cabinet body, an installation procedure is simpler, and costs required to produce the cabinet body are reduced. Besides, the power cabinet provided in this disclosure may be extended according to a requirement, and battery modules may be increased. This is implemented very easily, and more layers may be stacked. However, if the power cabinet having the cabinet body in the prior art needs to be extended, the cabinet body needs to be changed. This results in high costs and a complex procedure. Besides, the N plug-in components lead out the power line or the signal line of the battery module from the battery module, and electrically connect neighboring modules. This reduces cable use complexity and facilitates installation, and cable wiring is tidy and is safer.

In an embodiment, the $p^{th}$ plug-in component includes a $p^{th}$ plug-in female end and a $p^{th}$ plug-in male end that are electrically connected in cooperation with each other, one of the $p^{th}$ plug-in female end and the $p^{th}$ plug-in male end is disposed on the $p^{th}$ module, and the other is disposed on the $(p+1)$ module.

In an embodiment, the $p^{th}$ locking apparatus includes a $p^{th}$ locking female end and a $p^{th}$ locking male end that are connected in cooperation with each other, one of the $p^{th}$ locking female end and the $p^{th}$ locking male end is disposed on the $p^{th}$ module, and the other is disposed on the $(p+1)^{th}$ module.

In an embodiment, the power cabinet further includes a base stacked below an $M^{th}$ module, and an $(N+1)^{th}$ plug-in component configured to lead out the power line and/or the signal line, the $M^{th}$ module and the base are electrically connected by using the $(N+1)^{th}$ plug-in component, and the $M^{th}$ module and the base are connected by using an $(N+1)^{th}$ locking apparatus.

In an embodiment, the $(N+1)^{th}$ plug-in component includes an $(N+1)^{th}$ plug-in female end and an $(N+1)^{th}$ plug-in male end that are electrically connected in cooperation with each other, one of the $(N+1)^{th}$ plug-in female end and the $(N+1)^{th}$ plug-in male end is disposed on the base, and the other is disposed on the $M^{th}$ module.

In an embodiment, the $(N+1)^{th}$ locking apparatus includes an $(N+1)^{th}$ locking female end and an $(N+1)^{th}$ locking male end that are connected, one of the $(N+1)^{th}$ locking female end and the $(N+1)^{th}$ locking male end is disposed on the base, and the other is disposed on the $M^{th}$ module.

In an embodiment, the power cabinet further includes a dome stacked above a first module, and an $(N+2)^{th}$ plug-in component configured to lead out the power line and/or the signal line, the first module and the dome are electrically connected by using the $(N+2)^{th}$ plug-in component, and the first module and the dome are connected by using an $(N+2)^{th}$ locking apparatus.

In an embodiment, the $(N+2)^{th}$ plug-in component includes an $(N+2)^{th}$ plug-in female end and an $(N+2)^{th}$ plug-in male end that are electrically connected in cooperation with each other, one of the $(N+2)^{th}$ plug-in female end and the $(N+1)^{th}$ plug-in male end is disposed on the dome, and the other is disposed on the first module.

In an embodiment, the $(N+2)^{th}$ locking apparatus includes an $(N+2)^{th}$ locking female end and an $(N+2)^{th}$ locking male end that are connected in cooperation with each other, one of the $(N+2)^{th}$ locking female end and the $(N+2)^{th}$ locking male end is disposed on the dome, and the other is disposed on the first module.

In an embodiment, the power cabinet further includes: a $p^{th}$ protection groove and a $p^{th}$ protection bracket located in the $p^{th}$ protection groove, one of the $p^{th}$ protection groove and the $p^{th}$ protection bracket is disposed on the $p^{th}$ module, the other is disposed on the $(p+1)^{th}$ module, one of the $p^{th}$ plug-in female end and the $p^{th}$ plug-in male end is disposed in the $p^{th}$ protection bracket, and the other is disposed in the $p^{th}$ protection groove.

In an embodiment, the power cabinet further includes: an $(N+1)^{th}$ protection groove and an $(N+1)^{th}$ protection bracket located in the $(N+1)^{th}$ protection groove, one of the $(N+1)$ protection groove and the $(N+1)^{th}$ protection bracket is disposed on the base, the other is disposed on the $M^{th}$ module, one of the $(N+1)^{th}$ plug-in female end and the $(N+1)^{th}$ plug-in male end is disposed in the $(N+1)^{th}$ protection groove, and the other is disposed in the $(N+1)^{th}$ protection bracket.

In an embodiment, the power cabinet further includes: an $(N+2)^{th}$ protection groove and an $(N+2)^{th}$ protection bracket located in the $(N+2)^{th}$ protection groove, one of the $(N+2)^{th}$ protection groove and the $(N+2)^{th}$ protection bracket is disposed on the dome, the other is disposed on the first module, one of the $(N+2)^{th}$ plug-in female end and the $(N+2)^{th}$ plug-in male end is disposed in the $(N+2)^{th}$ protection groove, and the other is disposed in the $(N+2)^{th}$ protection bracket.

This disclosure further discloses a power cabinet, including: at least three modules sequentially stacked from top to bottom; at least two plug-in components, configured to lead out a power line and/or a signal line; and multiple locking apparatuses, where two neighboring modules are electrically connected by using a plug-in component, two neighboring modules are connected by using at least one locking apparatus, at least one of the at least three modules is a battery management module, and remaining modules of the at least three modules are battery modules.

Additional aspects and advantages of this disclosure are described below, and some become obvious in the following descriptions or are known through practice of this disclosure.

BRIEF DESCRIPTION OF THE DRAWINGS

The foregoing and/or additional aspects and advantages of this disclosure become obvious and easily understood in descriptions of the embodiments with reference to the following accompanying drawings.

REFERENCE NUMERALS

First module 11; second module 12; third module 13; fourth module 14; fifth module 15; sixth module 16; seventh module 17; eighth module 18; ninth module 19; tenth module 10; base 20; plug-in male end 31; plug-in female end 32; locking male end 41; locking female end 42; power interface 51; signal interface 52; line plate 61; leading wire 62; battery pack 63; handle 70; protection bracket 81; and protection groove 82.

DETAILED DESCRIPTION

The following describes embodiments of this disclosure in detail. Examples of the embodiments are shown in the accompanying drawings, and same or similar reference numerals throughout the accompanying drawings indicate same or similar components or components having same or similar functions. The following embodiments described with reference to the accompanying drawings are exemplary, aim to explain this disclosure, and shall not be understood as limiting this disclosure.

In descriptions of this disclosure, it should be understood that direction or position relationships indicated by terms such as "length", "width", "thickness", "above", "below", "front", "back", "left", "right", "vertical", "horizontal", "top", "bottom", "inside", and "outside" are direction or position relationships based on the accompanying drawings, and are used only for conveniently describing this disclosure and simplifying descriptions, instead of indicating or suggesting that a represented apparatus or component needs to have a particular direction or is constructed and operated in a particular direction, and therefore shall not be understood as limiting this disclosure. In addition, terms "first" and "second" are used only for description purposes, and shall not be understood as indicating or suggesting relative importance or implicitly indicating a quantity of indicated technical features. Therefore, features modified by "first" and "second" may explicitly or implicitly include one or more features. In descriptions of this disclosure, "multiple" means two or more, unless otherwise defined clearly and specifically.

In this disclosure, unless otherwise clearly specified and defined, terms such as "installation", "interconnection", "connection", and "fixing" shall be understood in a broad sense, for example, may be a fixing connection, a detachable connection, an integral connection, a mechanical connection, an electrical connection, a direct connection, an indirect connection by using an intermediate medium, and communication between interiors of two components. A person of ordinary skill in the art may understand specific meanings of the foregoing terms in this disclosure according to a specific situation.

The power cabinet provided in this disclosure includes M modules. The M modules may include a first module, a second module, . . . , an $(M-1)^{th}$ module, and an $M^{th}$ module. The first module, the second module, . . . , the $(M-1)^{th}$ module, and the $M^{th}$ module are sequentially stacked from top to bottom. The first module is located at the top, and the second module is disposed below the first module. Similarly, a penultimate module is the $(M-1)^{th}$ module, and the $M^{th}$ module is located at the bottom. In this disclosure, M may be any integer greater than or equal to 3. For example, in FIG. 1, M is 10.

In this disclosure, to facilitate assembly and tidy appearance of the entire power cabinet, the first module, the second module, . . . , the $(M-1)^{th}$ module, and the $M^{th}$ module are generally all produced as modules having same appearances and sizes. This can avoid distinguishing the modules in an installation process, and any module may be directly used and stacked without distinguishing whether the selected module satisfies an installation requirement. In this way, the assembly and tidy appearance of the entire power cabinet can be desirably controlled.

In the foregoing, the first module, the second module, ..., the $(M-1)^{th}$ module, and the $M^{th}$ module are sequentially stacked from top to bottom. In this disclosure, it indicates that the first module, the second module, ..., the $(M-1)^{th}$ module, and the $M^{th}$ module are directly stacked and interconnected. The modules are not only interconnected but also in communication connection with each other, including a power connection and/or a signal connection, and the like. As can be predicted, this disclosure provides a power cabinet formed by stacking and interconnecting modules, and a person skilled in the art may add a housing outside the power cabinet, or place the power cabinet in another installation space based on this disclosure without departing from the protection scope of this disclosure.

The power cabinet provided in this disclosure further includes N plug-in components used to lead out the power line and/or the signal line. The N plug-in components include a first plug-in component, ..., and an $N^{th}$ plug-in component. N may be any integer greater than or equal to 2. Each plug-in component includes a plug-in female end and a plug-in male end. A person skilled in the art easily understands that the power line and/or the signal line in each module is led out to a plug-in component corresponding to the module, and then the power lines and/or the signal lines in two neighboring modules are connected by using the plug-in component.

In an embodiment of this disclosure, a module of the power cabinet may be a battery module, including a housing and a battery pack disposed in the housing. The battery pack leads out a leading wire, the leading wire is the power line and/or the signal line, and the leading wire is connected to the plug-in component after passing through a line plate. Furthermore, the first plug-in component includes a first plug-in female end and a first plug-in male end. Similarly, the $N^{th}$ plug-in component includes an $N^{th}$ plug-in female end and an $N^{th}$ plug-in male end. In this disclosure, in any case, battery modules used as the second module to the $(M-1)^{th}$ module except the first module and the $M^{th}$ module include two plug-in terminals. In this case, a positive pigtail and a negative pigtail of the leading wire of the battery module separately lead out to the two different plug-in terminals. Certainly, the foregoing configuration is only an embodiment of this disclosure. In an actual solution, the first module and the $M^{th}$ module may also include two plug-in terminals, and a specific structure is very easily understood by a person skilled in the art. In an embodiment, all battery modules of the power cabinet have same structures, a plug-in female end is disposed above each battery module, and a plug-in male end is disposed below each battery module. In this way, the power cabinet may be assembled more easily, and extension of the power cabinet is better facilitated.

The leading wire (the power line and/or the signal line) led out from the battery pack is connected to the line plate, and the line plate leads out an output line to electrically connect to a plug-in female end or a plug-in male end above or below the battery module, and to be led out by the plug-in female end or the plug-in male end.

In the power cabinet, a $p^{th}$ module and a $(p+1)^{th}$ module are electrically connected by using a $p^{th}$ plug-in component, where p is an integer and $1 \leq p \leq M-1$. That is, the first module and the second module are electrically connected by using the first plug-in component. That is, the first plug-in component is disposed between the first module and the second module. In the power cabinet shown in FIG. 1, the first plug-in component is located between the first module and the second module. The first plug-in component implements a communication and/or electrical connection between the first module and the second module. Similarly, the power cabinet further includes the second plug-in component, ..., and an (N−1)th plug-in component sequentially disposed from top to bottom. The second plug-in component is located between the second module and the third module. Similarly, a person skilled in the art may very easily understand locations, effects, and functions of the plug-in components. The $(M-1)^{th}$ module and the $M^{th}$ module of the power cabinet are electrically connected by using the N plug-in component. That is, the $N^{th}$ plug-in component is disposed between the $(M-1)^{th}$ module and the $M^{th}$ module. The $N^{th}$ plug-in component implements a communication and/or electrical connection between the $(M-1)^{th}$ module and the $M^{th}$ module.

In the power cabinet, the first plug-in component, ..., and the $N^{th}$ plug-in component are used, so that the first module, the second module, ..., the $(M-1)^{th}$ module, and the $M^{th}$ module can implement a signal connection and/or an electrical connection more orderly and easily. This can avoid messed wiring in the cabinet body of the power cabinet in the prior art, and improve wiring safety of the power cabinet.

In an embodiment, the power cabinet further includes N locking apparatuses. Each locking apparatus may include a locking female end and a locking male end, and N may be any integer greater than or equal to 2. A $p^{th}$ module and a $(p+1)^{th}$ module are connected by using a $p^{th}$ locking apparatus, where p is an integer and $1 \leq p \leq M-1$. That is, a first locking apparatus is disposed between the first module and the second module. Similarly, an $N^{th}$ locking apparatus is disposed between the $(M-1)^{th}$ module and the $M^{th}$ module. The first module and the second module are connected by using the first locking apparatus. Similarly, the $(M-1)^{th}$ module and the $M^{th}$ module are connected by using the $N^{th}$ locking apparatus. Multiple plug-in components and multiple locking apparatuses are simultaneously disposed to implement a mechanical connection and an electrical connection. The modules are desirably fixed and connected in installation by using the multiple locking apparatuses. In one aspect, this improves installation efficiency, reduces installation costs, and facilitates installation. In another aspect, extensibility of the modules is improved by using the multiple locking apparatuses. Besides, each locking apparatus may have a structure that is detachable or can remove fixed installation. Therefore, extension and maintenance of the power cabinet is better facilitated. In another embodiment, one locking apparatus or multiple locking apparatuses may be disposed between every two modules. For example, four locking apparatuses may be disposed at four corners of the module. This can improve stability of connection between the modules, and usage safety of the entire power cabinet.

In an embodiment, the locking apparatuses may be disposed above and below each of the second module to the $(M-1)^{th}$ module. Specifically, a locking female end or a locking male end is disposed above each module, and a locking male end or a locking female end is disposed below each module. Further, the second module to the $(M-1)^{th}$ module have completely same structures, and locking apparatuses of the second module to the $(M-1)^{th}$ module are also the same. The second module to the $(M-1)^{th}$ module may be randomly used or installed without considering a correspondence.

In this disclosure, at least one of the first module, the second module, ..., the $(M-1)^{th}$ module, and the $M^{th}$ module is a battery management module, and remaining modules of the first module, the second module, ..., the $(M-1)^{th}$ module, and the $M^{th}$ module are battery modules. N is greater than or equal to 2, and M is greater than or equal to 3.

Generally, a power cabinet has a battery management module. As well known by a person skilled in the art, the battery module is configured to provide energy to the entire power cabinet, and the battery management module performs effects or functions such as charging and discharging management, safety management, and power eliciting of the power cabinet.

In this disclosure, the first plug-in component includes a first plug-in female end and a first plug-in male end that are electrically connected in cooperation with each other, one of the first plug-in female end and the first plug-in male end is disposed on the first module, and the other is disposed on the second module. The foregoing solution includes two cases. In one case, the first module is provided with the first plug-in female end, and the second module is provided with the first plug-in male end, which may be referred to as reverse disposing of the first plug-in component. In the other case, the first module is provided with the first plug-in male end, and the second module is provided with the first plug-in female end, which may be referred to as forward disposing of the first plug-in component. The first plug-in component may be disposed forward or reversely between the first module and the second module. In this disclosure, locations of the first plug-in female end and the first plug-in male end, that is, forward disposing or reverse disposing of the first plug-in component are not limited, as long as the first plug-in component is disposed between the first module and the second module, and can implement an electrical connection (including a power connection and/or a signal connection) between the first module and the second module.

Similarly, the $N^{th}$ plug-in component includes an $N^{th}$ plug-in male end and an $N^{th}$ plug-in female end that are electrically connected in cooperation with each other, one of the $N^{th}$ plug-in male end and the $N^{th}$ plug-in female end is disposed on the $(M-1)^{th}$ module, and the other is disposed on the $M^{th}$ module. The foregoing solution includes two cases. In one case, the $(M-1)^{th}$ module is provided with the $N^{th}$ plug-in female end, and the $M^{th}$ module is provided with the $N^{th}$ plug-in male end, which may be referred to as reverse disposing of the $N^{th}$ plug-in component. In the other case, the $(M-1)^{th}$ module is provided with the $N^{th}$ plug-in male end, and the $M^{th}$ module is provided with the $N^{th}$ plug-in female end, which may be referred to as forward disposing of the $N^{th}$ plug-in component. In this disclosure, locations of the $N^{th}$ plug-in female end and the $N^{th}$ plug-in male end, that is, forward disposing or reverse disposing of the $N^{th}$ plug-in component are not limited, as long as the $N^{th}$ plug-in component is disposed between the $(M-1)^{th}$ module and the $M^{th}$ module, and can implement an effect of an electrical connection between the $(M-1)^{th}$ module and the $M^{th}$ module.

The first plug-in component, . . . , and the $N^{th}$ plug-in component, and an $(N+1)^{th}$ plug-in component and an $(N+2)^{th}$ plug-in component in the following may all be disposed forward or reversely. Alternatively, some of the first plug-in component, . . . , and the $N^{th}$ plug-in component, and the $(N+1)^{th}$ plug-in component and the $(N+2)^{th}$ plug-in component in the following are disposed forward, and remaining components are disposed reversely. This is not clearly limited in this disclosure.

Similar to the plug-in component, to desirably mechanically connect two successive modules to form the stable power cabinet, the first locking apparatus includes a first locking female end and a first locking male end that are connected in cooperation with each other. One of the first locking female end and the first locking male end is disposed on the first module, and the other is disposed on the second module. The foregoing solution includes two cases. In one case, the first module is provided with the first locking female end, and the second module is provided with the first locking male end, which may be referred to as reverse disposing of the first locking apparatus. In the other case, the first module is provided with the first locking male end, and the second module is provided with the first locking female end, which may be referred to as forward disposing of the first locking apparatus. The first locking apparatus may be disposed forward or reversely between the first module and the second module. In this disclosure, locations of the first locking female end and the first locking male end, that is, forward disposing or reverse disposing of the first locking apparatus are not limited, as long as the first locking apparatus is disposed between the first module and the second module, and can implement a mechanical connection between the first module and the second module.

Similarly, the N locking apparatus includes an $N^{th}$ locking male end and an $N^{th}$ locking female end that are connected in cooperation with each other, one of the $N^{th}$ locking male end and the $N^{th}$ locking female end is disposed on the $(M-1)^{th}$ module, and the other is disposed on the $M^{th}$ module. The foregoing solution includes two cases. In one case, the $(M-1)^{th}$ module is provided with the $N^{th}$ locking female end, and the $M^{th}$ module is provided with the $N^{th}$ locking male end, which may be referred to as reverse disposing of the $N^{th}$ locking apparatus. In the other case, the $(M-1)^{th}$ module is provided with the $N^{th}$ locking male end, and the $M^{th}$ module is provided with the $N^{th}$ locking female end, which may be referred to as forward disposing of the $N^{th}$ locking apparatus. In this disclosure, locations of the N locking female end and the $N^{th}$ locking male end, that is, forward disposing or reverse disposing of the $N^{th}$ locking apparatus are not limited, as long as the $N^{th}$ locking apparatus is disposed between the $(M-1)^{th}$ module and the $M^{th}$ module, and can implement an effect of a mechanical connection between the $(M-1)^{th}$ module and the $M^{th}$ module.

The first locking apparatus, . . . , and the $N^{th}$ locking apparatus, and an $(N+1)^{th}$ locking apparatus and an $(N+2)^{th}$ locking apparatus in the following may all be disposed forward or reversely. Alternatively, some of the first locking apparatus, . . . , and the $N^{th}$ locking apparatus, and the $(N+1)^{th}$ locking apparatus and the $(N+2)^{th}$ locking apparatus in the following are disposed forward, and remaining components are disposed reversely. This is not clearly limited in this disclosure.

To facilitate installation of the $M^{th}$ module, form a gap between the $M^{th}$ module and a plane on which the power cabinet is disposed by supporting, and ensure safety and a service life of the $M^{th}$ module or the entire power cabinet, in an embodiment, a base is disposed below the $M^{th}$ module. The base and the $M^{th}$ module are electrically connected by using the $(N+1)^{th}$ plug-in component, and the $M^{th}$ module and the base are connected by using the $(N+1)^{th}$ locking apparatus.

In the foregoing example, a location relationship and a selection manner of the $(N+1)^{th}$ plug-in component and the $(N+1)^{th}$ locking apparatus between the $M^{th}$ module and the base are similar to that of the $N^{th}$ plug-in component described above. A difference is only that the $(N+1)^{th}$ plug-in component and the $(N+1)^{th}$ locking apparatus are located between the base and the $M^{th}$ module.

The $(N+1)^{th}$ plug-in component includes an $(N+1)^{th}$ plug-in female end and an $(N+1)^{th}$ plug-in male end that are electrically connected in cooperation with each other, one of the $(N+1)^{th}$ plug-in female end and the $(N+1)^{th}$ plug-in male end is disposed on the $M^{th}$ module, and the other is disposed on the base. The foregoing solution includes two cases. In one case, the $M^{th}$ module is provided with the $(N+1)^{th}$ plug-in female end, and the base is provided with the $(N+1)^{th}$ plug-in male end, which may be referred to as reverse disposing of the $(N+1)^{th}$ plug-in component. In the other case, the $M^{th}$ module is provided with the $(N+1)^{th}$ plug-in male end, and the base is provided with the $(N+1)^{th}$ plug-in female end, which may be referred to as forward disposing of the $(N+1)^{th}$ plug-in component. The $(N+1)^{th}$ plug-in component may be disposed forward or reversely between the $M^{th}$ module and the base. In this disclosure, locations of the $(N+1)^{th}$ plug-in female end and the $(N+1)^{th}$ plug-in male end, that is, forward disposing or reverse disposing of the $(N+1)^{th}$ plug-in component are not limited, as long as the $(N+1)^{th}$ plug-in component is disposed between the $M^{th}$ module and the base, and can implement an electrical connection between the $M^{th}$ module and the base.

The $(N+1)^{th}$ locking apparatus includes an $(N+1)^{th}$ locking female end and an $(N+1)^{th}$ locking male end that are connected in cooperation with each other, one of the $(N+1)^{th}$ locking female end and the $(N+1)^{th}$ locking male end is disposed on the $M^{th}$ module, and the other is disposed on the base. The foregoing solution includes two cases. In one case, the $M^{th}$ module is provided with the $(N+1)^{th}$ locking female end, and the base is provided with the $(N+1)^{th}$ locking male end, which may be referred to as reverse disposing of the $(N+1)^{th}$ locking apparatus. In the other case, the $M^{th}$ module is provided with the $(N+1)^{th}$ locking male end, and the base is provided with the $(N+1)^{th}$ locking female end, which may be referred to as forward disposing of the $(N+1)^{th}$ locking apparatus. The $(N+1)^{th}$ locking apparatus may be disposed forward or reversely between the $M^{th}$ module and the base. In this disclosure, locations of the $(N+1)^{th}$ locking female end and the $(N+1)^{th}$ locking male end, that is, forward disposing or reverse disposing of the $(N+1)^{th}$ locking apparatus are not limited, as long as the $(N+1)^{th}$ locking apparatus is disposed between the $M^{th}$ module and the base, and can implement a mechanical connection between the $M^{th}$ module and the base.

In addition, in this disclosure, a dome and an $(N+2)^{th}$ plug-in component configured to lead out the power line and/or the signal line may be further disposed above a first module, the first module and the dome are electrically connected by using the $(N+2)^{th}$ plug-in component, and the first module and the dome are connected by using an $(N+2)^{th}$ locking apparatus.

In the foregoing embodiment, a location relationship and a selection manner of the $(N+2)^{th}$ plug-in component and the $(N+2)^{th}$ locking apparatus between the first module and the dome are similar to that of the N plug-in component described above. A difference is only that the $(N+2)^{th}$ plug-in component and the $(N+2)^{th}$ locking apparatus are located between the dome and the first module.

The $(N+2)^{th}$ plug-in component includes an $(N+2)^{th}$ plug-in female end and an $(N+2)^{th}$ plug-in male end that are electrically connected in cooperation with each other, one of the $(N+2)^{th}$ plug-in female end and the $(N+2)^{th}$ plug-in male end is disposed on the first module, and the other is disposed on the dome. The foregoing solution includes two cases. In one case, the dome is provided with the $(N+2)^{th}$ plug-in female end, and the first module is provided with the $(N+2)^{th}$ plug-in male end, which may be referred to as reverse disposing of the $(N+2)^{th}$ plug-in component. In the other case, the dome is provided with the $(N+2)^{th}$ plug-in male end, and the first module is provided with the $(N+2)^{th}$ plug-in female end, which may be referred to as forward disposing of the $(N+2)^{th}$ plug-in component. The $(N+2)^{th}$ plug-in component may be disposed forward or reversely between the first module and the dome. In this disclosure, locations of the $(N+2)^{th}$ plug-in female end and the $(N+2)^{th}$ plug-in male end, that is, forward disposing or reverse disposing of the $(N+2)^{th}$ plug-in component are not limited, as long as the $(N+2)^{th}$ plug-in component is disposed between the first module and the dome, and can implement an electrical connection between the first module and the dome.

The $(N+2)^{th}$ locking apparatus includes an $(N+2)^{th}$ locking female end and an $(N+2)^{th}$ locking male end that are connected in cooperation with each other, one of the $(N+2)^{th}$ locking female end and the $(N+2)^{th}$ locking male end is disposed on the first module, and the other is disposed on the dome. The foregoing solution includes two cases. In one case, the dome is provided with the $(N+2)^{th}$ locking female end, and the first module is provided with the $(N+2)^{th}$ locking male end, which may be referred to as reverse disposing of the $(N+2)^{th}$ locking apparatus. In the other case, the dome is provided with the $(N+2)^{th}$ locking male end, and the first module is provided with the $(N+2)^{th}$ locking female end, which may be referred to as forward disposing of the $(N+2)^{th}$ locking apparatus. The $(N+2)^{th}$ locking apparatus may be disposed forward or reversely between the first module and the dome. In this disclosure, locations of the $(N+2)^{th}$ locking female end and the $(N+2)^{th}$ locking male end, that is, forward disposing or reverse disposing of the $(N+2)^{th}$ locking apparatus are not limited, as long as the $(N+2)^{th}$ locking apparatus is disposed between the first module and the dome, and can implement a mechanical connection between the first module and the dome.

In this disclosure, the power cabinet further includes N protection grooves and N protection brackets, where N may be any integer greater than or equal to 2. The plug-in female end and the plug-in male end are separately disposed in the protection groove or the protection bracket. In one aspect, the protection groove and the protection bracket facilitate positioning of the plug-in female end and the plug-in male end. In another aspect, the plug-in female end and the plug-in male end are protected, and the plug-in male end or the plug-in female end is prevented from being damaged when a module falls down during assembly. Specifically, one of the protection groove and the protection bracket may be located on one of two neighboring modules, and the other is located on the other of the two neighboring modules. Generally, the protection groove and the protection bracket appear in pairs, the plug-in female end is located in one of the protection groove or the protection bracket, and the plug-in male end is located in the other of the protection bracket or the protection groove. For example, the plug-in female end is located in the protection groove, and the plug-in male end is located in the protection bracket; or the plug-in female end is located in the protection bracket, and the plug-in male end is located in the protection groove. For example, the $p^{th}$ plug-in female end and the $p^{th}$ plug-in male end are respectively connected to the $p^{th}$ module and the $(p+1)^{th}$ module, and at least one of the $p^{th}$ plug-in female end and the $p^{th}$ plug-in male end is moveable within a predetermined range relative to the corresponding $p^{th}$ module and the $(p+1)^{th}$ module. When the $p^{th}$ protection bracket is coupled to the $p^{th}$ protection groove, the $p^{th}$ plug-in female end and the $p^{th}$ plug-in male end are driven to be moved and matched with each other.

A first protection bracket may be positioned in a first protection groove, one of the first protection groove and the first protection bracket is disposed in the first module, and the other is disposed in the second module. One of the first plug-in female end and the first plug-in male end is disposed in the first protection bracket, and the other is disposed in the first protection groove.

In the foregoing solution, the first protection groove and the first protection bracket are disposed in two manners. In one manner, the first module is provided with the first protection bracket, and the second module is provided with the first protection groove, which may be referred to as forward disposing of the first protection bracket and the first protection groove. In the other manner, the first module is provided with the first protection groove, and the second module is provided with the first protection bracket, which may be referred to as reverse disposing of the first protection bracket and the first protection groove. In this disclosure, locations of the first protection bracket and the first protection groove, that is, forward disposing or reverse disposing of the first protection bracket and the first protection groove are not limited, as long as the first protection bracket and the first protection groove are disposed between the first module and the second module.

Besides, in the foregoing solution, the first plug-in female end and the first plug-in male end are also disposed in two manners. In one manner, the first plug-in female end is disposed in the first protection bracket, and the first plug-in male end is disposed in the first protection groove. In the other manner, the first plug-in female end is disposed in the first protection groove, and the first plug-in male end is disposed in the first protection bracket.

With reference to the foregoing disposing manners, as can be learned by permutation and combination in the foregoing solution, the first protection groove, the first protection bracket, the first plug-in female end, and the first plug-in male end may be disposed in four manners in total.

Similarly, in this disclosure, the $N^{th}$ protection bracket is positioned in the $N^{th}$ protection groove, one of the $N^{th}$ protection groove and the $N^{th}$ protection bracket is disposed on the $(M-1)^{th}$ module, and the other is disposed on the $M^{th}$ module. One of the $N^{th}$ plug-in female end and the $N^{th}$ plug-in male end is disposed in the $N^{th}$ protection groove, and the other is disposed in the $N^{th}$ protection bracket.

Similar to the foregoing manners of disposing the first protection groove and the first protection bracket, the $N^{th}$ protection groove and the $N^{th}$ protection bracket are also disposed in two manners. Besides, the $N^{th}$ plug-in female end and the $N^{th}$ plug-in male end are also combined with the $N^{th}$ protection groove and the $N^{th}$ protection bracket in two manners. Therefore, as can be learned by permutation and combination in the foregoing solution, the $N^{th}$ protection groove, the $N^{th}$ protection bracket, the $N^{th}$ plug-in female end, and the $N^{th}$ plug-in male end may be disposed in four manners in total.

Besides, in the technical solution of the base, the power cabinet further includes: an $(N+1)^{th}$ protection groove and an $(N+1)^{th}$ protection bracket located in the $(N+1)^{th}$ protection groove, one of the $(N+1)^{th}$ protection groove and the $(N+1)^{th}$ protection bracket is disposed on the base, the other is disposed on the $M^{th}$ module, one of the $(N+1)^{th}$ plug-in female end and the $(N+1)^{th}$ plug-in male end is disposed in the $(N+1)^{th}$ protection groove, and the other is disposed in the $(N+1)^{th}$ protection bracket.

In the foregoing solution, the $(N+1)^{th}$ protection groove and the $(N+1)^{th}$ protection bracket are disposed in two manners. In one manner, the $M^{th}$ module is provided with the $(N+1)^{th}$ protection bracket, and the base is provided with the $(N+1)^{th}$ protection groove, which may be referred to as forward disposing of the $(N+1)^{th}$ protection bracket and the $(N+1)^{th}$ protection groove. In the other manner, the $M^{th}$ module is provided with the $(N+1)^{th}$ protection groove, and the base is provided with the $(N+1)^{th}$ protection bracket, which may be referred to as reverse disposing of the $(N+1)^{th}$ protection bracket and the $(N+1)^{th}$ protection groove. In this disclosure, locations of the $(N+1)^{th}$ protection bracket and the $(N+1)^{th}$ protection groove, that is, forward disposing or reverse disposing of the $(N+1)^{th}$ protection bracket and the $(N+1)^{th}$ protection groove are not limited, as long as the $(N+1)^{th}$ protection bracket and the $(N+1)^{th}$ protection groove are disposed between the $M^{th}$ module and the base.

Besides, in the foregoing solution, the $(N+1)^{th}$ plug-in female end and the $(N+1)^{th}$ plug-in male end are also disposed in two manners. In one manner, the $(N+1)^{th}$ plug-in female end is disposed in the $(N+1)^{th}$ protection bracket, and the $(N+1)^{th}$ plug-in male end is disposed in the $(N+1)^{th}$ protection groove. In the other manner, the $(N+1)^{th}$ plug-in female end is disposed in the $(N+1)^{th}$ protection groove, and the $(N+1)^{th}$ plug-in male end is disposed in the $(N+1)^{th}$ protection bracket.

With reference to the foregoing disposing manners, as can be learned by permutation and combination in the foregoing solution, the $(N+1)^{th}$ protection groove, the $(N+1)^{th}$ protection bracket, the $(N+1)^{th}$ plug-in female end, and the $(N+1)^{th}$ plug-in male end may be disposed in four manners in total.

In another embodiment of this disclosure, the power cabinet further includes: an $(N+2)^{th}$ protection groove and an $(N+2)^{th}$ protection bracket located in the $(N+2)^{th}$ protection groove, one of the $(N+2)^{th}$ protection groove and the $(N+2)^{th}$ protection bracket is disposed on the dome, the other is disposed on the first module, one of the $(N+2)^{th}$ plug-in female end and the $(N+2)^{th}$ plug-in male end is disposed in the $(N+2)^{th}$ protection groove, and the other is disposed in the $(N+2)^{th}$ protection bracket.

In the foregoing solution, the $(N+2)^{th}$ protection groove and the $(N+2)^{th}$ protection bracket are disposed in two manners. In one manner, the dome is provided with the $(N+2)^{th}$ protection bracket, and the first module is provided with the $(N+2)^{th}$ protection groove, which may be referred to as forward disposing of the $(N+2)^{th}$ protection bracket and the $(N+2)^{th}$ protection groove. In the other manner, the dome is provided with the $(N+2)^{th}$ protection groove, and the first module is provided with the $(N+2)^{th}$ protection bracket, which may be referred to as reverse disposing of the $(N+2)^{th}$ protection bracket and the $(N+2)^{th}$ protection groove. In this disclosure, locations of the $(N+2)^{th}$ protection bracket and the $(N+2)^{th}$ protection groove, that is, forward disposing or reverse disposing of the $(N+2)^{th}$ protection bracket and the $(N+2)^{th}$ protection groove are not limited, as long as the $(N+2)^{th}$ protection bracket and the $(N+2)^{th}$ protection groove are disposed between the dome and the first module.

Besides, in the foregoing solution, the $(N+2)^{th}$ plug-in female end and the $(N+2)^{th}$ plug-in male end are also disposed in two manners. In one manner, the $(N+2)^{th}$ plug-in female end is disposed in the $(N+2)^{th}$ protection bracket, and the $(N+2)^{th}$ plug-in male end is disposed in the $(N+2)^{th}$ protection groove. In the other manner, the $(N+2)^{th}$ plug-in female end is disposed in the $(N+2)^{th}$ protection groove, and the $(N+2)^{th}$ plug-in male end is disposed in the $(N+2)^{th}$ protection bracket.

With reference to the foregoing disposing manners, as can be learned by permutation and combination in the foregoing solution, the $(N+2)^{th}$ protection groove, the $(N+2)^{th}$ protection bracket, the $(N+2)^{th}$ plug-in female end, and the $(N+2)^{th}$ plug-in male end may be disposed in four manners in total.

The power cabinet provided in this disclosure is described below by using a specific embodiment.

Figure 1:
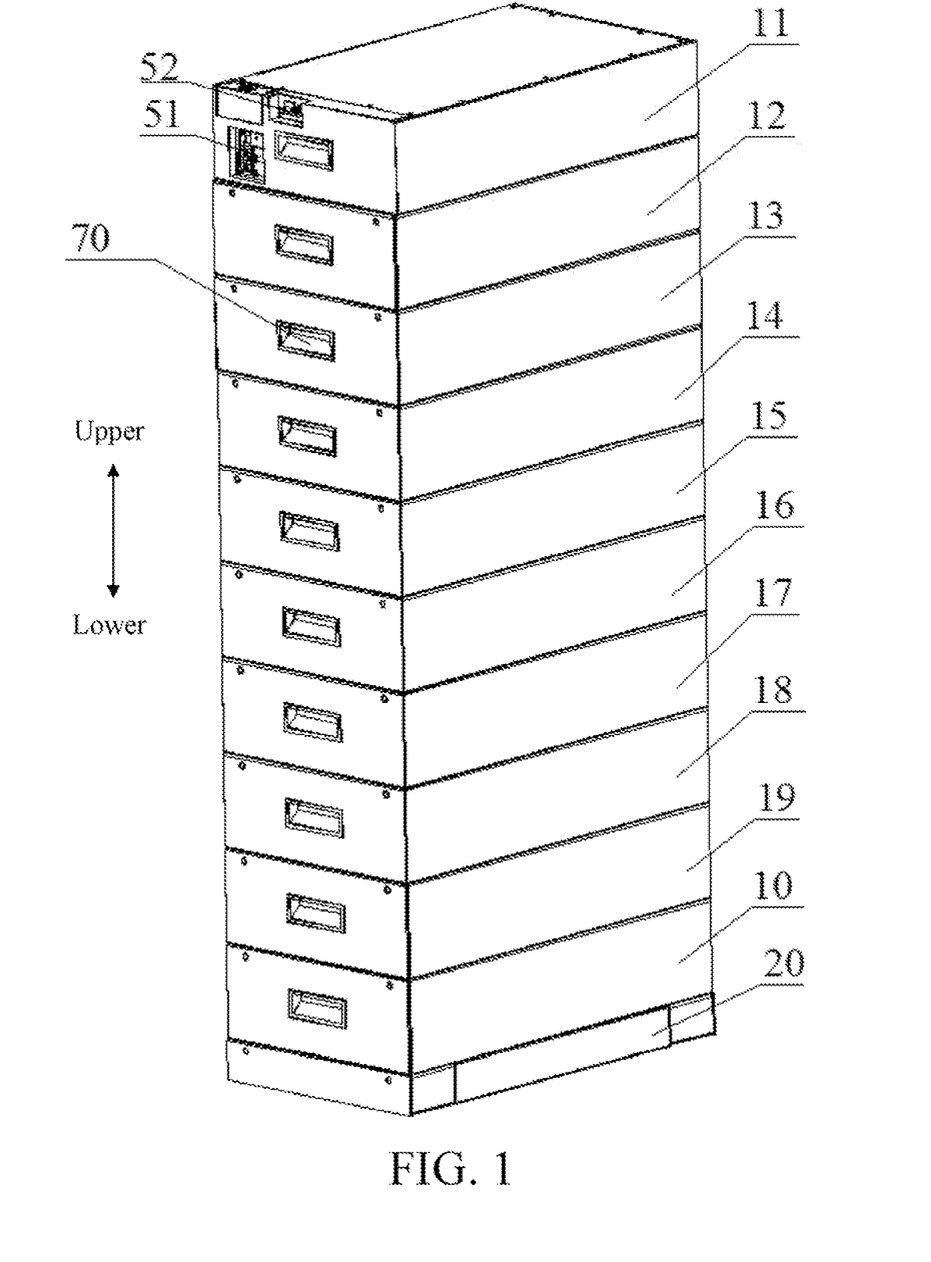
FIG. 1 is a solid view of a power cabinet according to an embodiment of this disclosure.

As shown in FIG. 1, the power cabinet provided in this embodiment includes a first module 11, a second module 12, a third module 13, a fourth module 14, a fifth module 15, a sixth module 16, a seventh module 17, an eighth module 18, a ninth module 19, and a tenth module 10 sequentially disposed from top to bottom. The first module 11 is a battery management module, and the remaining modules are battery modules.

In one embodiment, a first plug-in component is disposed between the first module 11 and the second module 12, a second plug-in component is disposed between the second module 12 and the third module 13, and so on, an eighth plug-in component is disposed between the eighth module 18 and the ninth module 19, and a ninth plug-in component is disposed between a ninth module 19 and a tenth module 10. In the accompanying drawings of this disclosure, not each plug-in component is marked and described in the accompanying drawings. The following describes the plug-in component by using a schematic diagram of a battery management module and a battery module.

Figure 2:
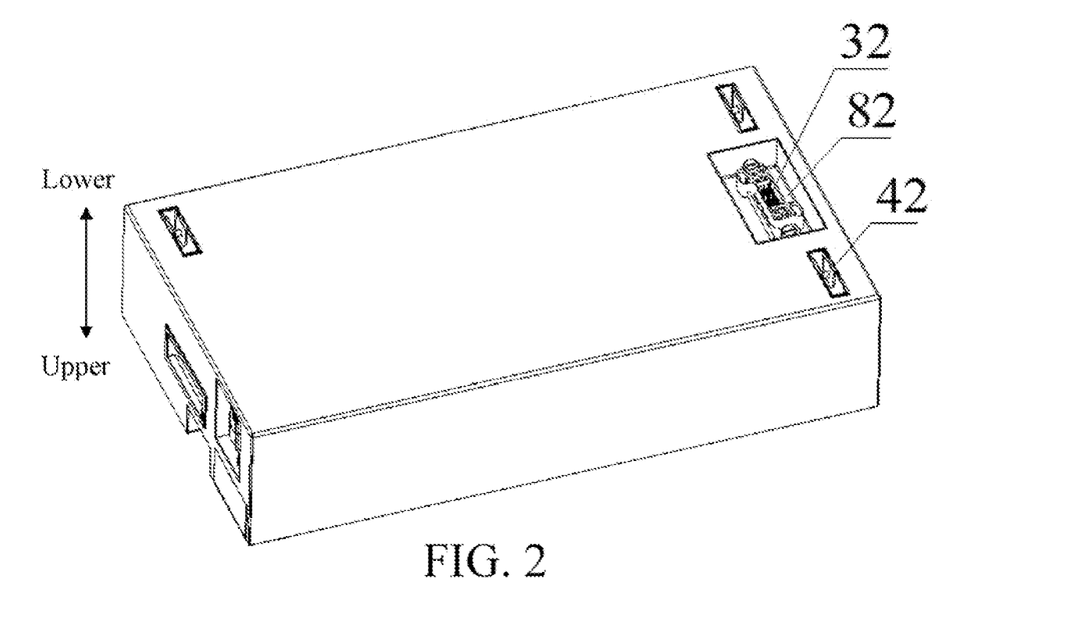
FIG. 2 is a schematic structural diagram of a battery management module of the power cabinet shown in FIG. 1, where a lower surface of the battery management module is exposed.

As shown in FIG. 2, the first module 11, that is, the battery management module, is located at the top of the power cabinet. No plug-in component and no locking apparatus are disposed above the battery management module, and a plug-in female end 32, a protection groove 82, and a locking female end 42 are disposed only below the battery management module, that is, a side close to the second module. In this embodiment, in FIG. 2, the plug-in female end 32 is a first plug-in female end, the protection groove 82 is a first protection groove, and the locking female end 42 is a first locking female end.

Figure 3:
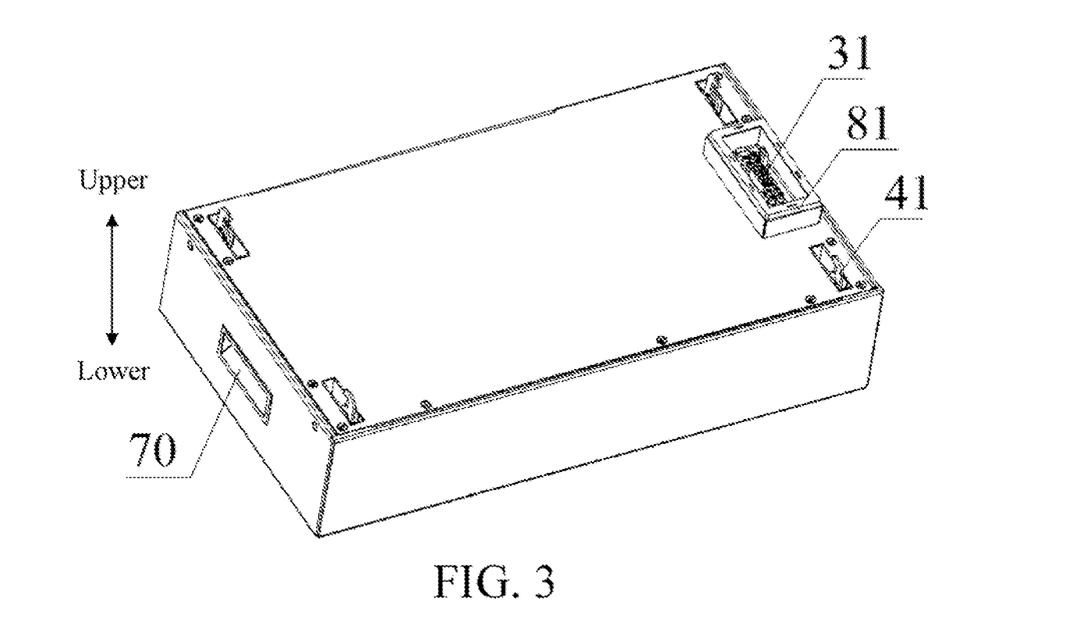
FIG. 3 is a schematic structural diagram of a battery module of the power cabinet shown in FIG. 1, where an upper surface of the battery module is exposed.

FIG. 3 is a schematic structural diagram of a battery module of a power cabinet. In the figure, a plug-in male end 31, a protection bracket 81, and a locking male end 41 are disposed above the battery module. The battery module may be any one of the second module 12 to the tenth module 10 in FIG. 1. When the battery module is the second module 12 in FIG. 1, the plug-in male end 31 is the first plug-in male end, the protection bracket 81 is the first protection bracket, and the locking male end 41 is the first locking male end.

Figure 4:
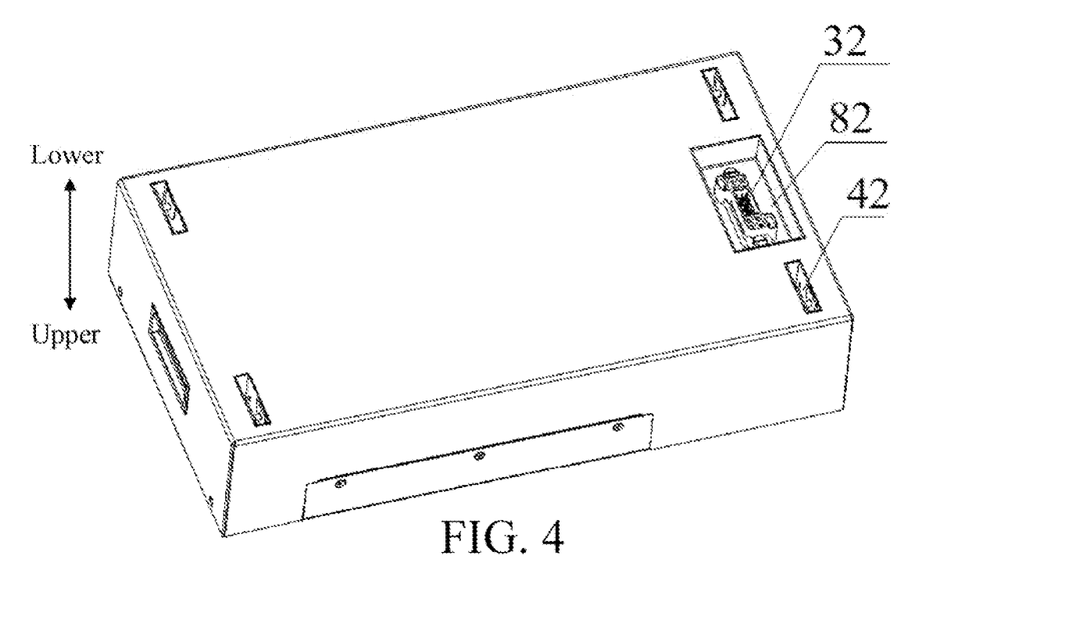
FIG. 4 is a schematic structural diagram of a battery module of the power cabinet shown in FIG. 1, where a lower surface of the battery module is exposed.

Besides, as shown in FIG. 4, based on FIG. 3, a plug-in female end 32, a protection groove 82, and a locking female end 42 are disposed below the battery module. The battery module may be any one of the second module to the tenth module in FIG. 1. When the battery module is the second module in FIG. 1, the plug-in female end 32 is the second plug-in female end, the protection groove 82 is the second protection groove, and the locking female end 42 is the second locking female end.

Similarly, in this disclosure, the battery modules are sequentially disposed in FIG. 1, and all battery modules have same shapes and designs, that is, all battery modules have same upper sides and lower sides.

Figure 5:
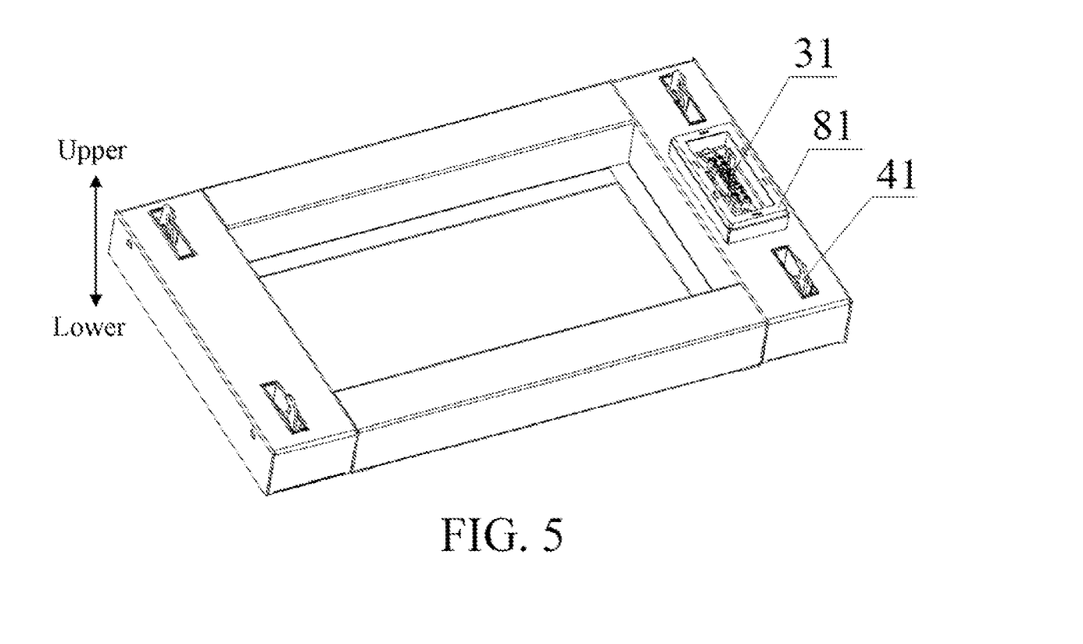
FIG. 5 is a schematic structural diagram of a base of the power cabinet shown in FIG. 1, where an upper surface of the base is exposed.

In addition, in the power cabinet shown in FIG. 1, the base 20 is disposed at the bottom. As shown in FIG. 5, a plug-in male end 31, a locking male end 41, and a protection bracket 81 are disposed above the base 20. Based on the embodiment shown in FIG. 1, as shown in FIG. 5, the plug-in male end 31 is a tenth plug-in male end, the locking male end 41 is a tenth locking male end, and the protection bracket 81 is a tenth protection bracket.

As shown in FIG. 1 to FIG. 4, in the embodiments, a handle 70 is further disposed on each module of the power cabinet, and the handle 70 facilitates installation and usage of each module.

As shown in FIG. 2, the battery management module is provided with a power interface 51 and a signal interface 52. The power interface 51 is configured to lead out a positive electrode and a negative electrode of the power cabinet, and the signal interface 52 is configured to lead out a sampling line.

Figure 6:
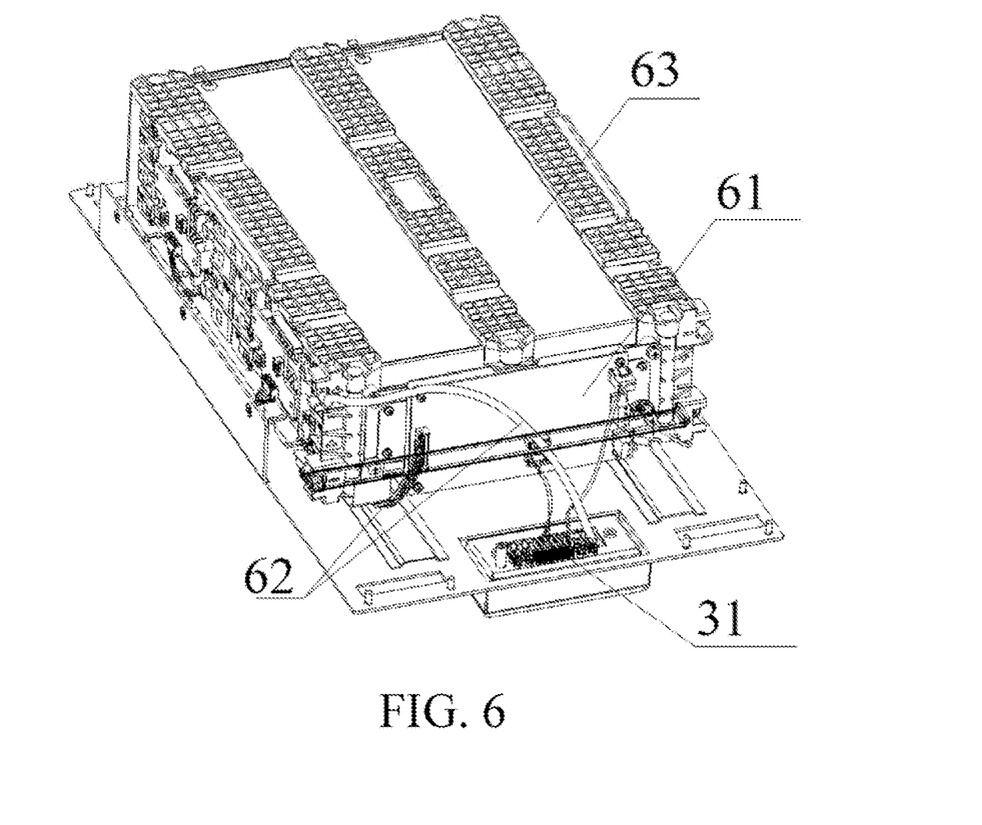
FIG. 6 is a schematic diagram of an internal structure of a battery module.

As shown in FIG. 6, an example in which wiring of the battery module is led out to the plug-in male end 31 is used to describe composition and wiring of the battery module. A leading wire 62 of a battery pack 63 is connected to a line plate 61, and is connected to the plug-in male end 31 by using the line plate 61, to lead out a power line and/or a signal line in the battery module to the plug-in male end. Certainly, design of a plug-in female end is also similar to that shown in the figure, and details are not described herein again.

In the descriptions of this specification, descriptions such as reference terms "an embodiment", "some embodiments", "example", "specific example", or "some examples" intend to indicate that specific features, structures, materials, or characteristics described with reference to embodiments or examples are included in at least one embodiment or example of this disclosure. In this specification, exemplary descriptions of the foregoing terms do not necessarily indicate same embodiments or examples. In addition, described specific features, structures, materials, or characteristics may be combined in a proper manner in any one or more embodiments or examples.

Although the foregoing already shows and describes embodiments of this disclosure, it may be understood that the embodiments are exemplary, and shall not be understood as limiting this disclosure. A person of ordinary skill in the art may change, modify, replace, and alter the embodiments within the scope of this disclosure without departing from the principle and objective of this disclosure.

What is claimed is:

1. A power cabinet, comprising:
   M modules, wherein the M modules are sequentially stacked from top to bottom;
   N plug-in components, configured to lead out a power line and/or a signal line; and
   N locking apparatuses, wherein:
   a $p^{th}$ module and a $(p+1)^{th}$ module are electrically connected by using a $p^{th}$ plug-in component,
   the $p^{th}$ module and the $(p+1)^{th}$ module are connected by using a $p^{th}$ locking apparatus,
   M, N, and p are all integers, M≥3, N=M−1, 1≤p≤M−1,
   at least one of the M modules is a battery management module, and remaining modules of the M modules are battery modules;
   wherein the $p^{th}$ plug-in component comprises a $p^{th}$ plug-in female end and a $p^{th}$ plug-in male end that are electrically connected in cooperation with each other, one of the $p^{th}$ plug-in female end and the $p^{th}$ plug-in male end is disposed on the $p^{th}$ module, and the other is disposed on the $(p+1)^{th}$ module; the power cabinet further comprises: a $p^{th}$ protection groove and a $p^{th}$ protection bracket located in the $p^{th}$ protection groove, one of the $p^{th}$ protection groove and the $p^{th}$ protection bracket is disposed on the $p^{th}$ module, the other is disposed on the (p+1)$^{th}$ module, one of the p$^{th}$ plug-in female end and the p$^{th}$ plug-in male end is disposed in the p$^{th}$ protection bracket, and the other is disposed in the p$^{th}$ protection groove.

2. The power cabinet according to claim 1, wherein the p$^{th}$ plug-in female end and the p$^{th}$ plug-in male end are respectively connected to the p$^{th}$ module and the (p+1)$^{th}$ module, and at least one of the p$^{th}$ plug-in female end and the p$^{th}$ plug-in male end is moveable within a pre-determined range relative to the corresponding p$^{th}$ module and the (p+1)$^{th}$ module;

when the p$^{th}$ protection bracket is coupled to the p$^{th}$ protection groove, the p$^{th}$ plug-in female end and the p$^{th}$ plug-in male end are driven to be moved and matched with each other.

3. The power cabinet according to claim 1, wherein the p$^{th}$ locking apparatus comprises a p$^{th}$ locking female end and a p$^{th}$ locking male end that are connected in cooperation with each other, one of the p$^{th}$ locking female end and the p$^{th}$ locking male end is disposed on the p$^{th}$ module, and the other is disposed on the (p+1)$^{th}$ module.

4. The power cabinet according to claim 1, wherein the power cabinet further comprises a base stacked below an M$^{th}$ module, and an (N+1)$^{th}$ plug-in component configured to lead out the power line and/or the signal line, the M$^{th}$ module and the base are electrically connected by using the (N+1)$^{th}$ plug-in component, and the M$^{th}$ module and the base are connected by using an (N+1)$^{th}$ locking apparatus; wherein the base is adapted to be fixed to the ground.

5. The power cabinet according to claim 4, wherein the (N+1)$^{th}$ plug-in component comprises an (N+1)$^{th}$ plug-in female end and an (N+1)$^{th}$ plug-in male end that are electrically connected in cooperation with each other, one of the (N+1)$^{th}$ plug-in female end and the (N+1)$^{th}$ plug-in male end is disposed on the base, and the other is disposed on the M$^{th}$ module.

6. The power cabinet according to claim 4, wherein the (N+1)$^{th}$ locking apparatus comprises an (N+1)$^{th}$ locking female end and an (N+1)$^{th}$ locking male end that are connected, one of the (N+1)$^{th}$ locking female end and the (N+1)$^{th}$ locking male end is disposed on the base, and the other is disposed on the M$^{th}$ module.

7. The power cabinet according to claim 5, wherein the power cabinet further comprises: an (N+1)$^{th}$ protection groove and an (N+1)$^{th}$ protection bracket located in the (N+1)$^{th}$ protection groove, one of the (N+1)$^{th}$ protection groove and the (N+1)$^{th}$ protection bracket is disposed on the base, the other is disposed on the M$^{th}$ module, one of the (N+1)$^{th}$ plug-in female end and the (N+1)$^{th}$ plug-in male end is disposed in the (N+1)$^{th}$ protection groove, and the other is disposed in the (N+1)$^{th}$ protection bracket.

8. A power cabinet, comprising:
at least three modules sequentially stacked from top to bottom;
at least two plug-in components, configured to lead out a power line and/or a signal line; and
multiple locking apparatuses, wherein
two neighboring modules are electrically connected by using a plug-in component,
two neighboring modules are connected by using at least one locking apparatus,
at least one of the at least three modules is a battery management module, and remaining modules of the at least three modules are battery modules,
wherein the plug-in component comprises a plug-in female end and a plug-in male end that are electrically connected in cooperation with each other, one of the plug-in female end and the plug-in male end is disposed on one neighboring module, and the other is disposed on the other neighboring module; the power cabinet further comprises: a protection groove and a protection bracket located in the protection groove, one of the protection groove and the protection bracket is disposed on one neighboring module, the other is disposed on the other neighboring module, one of the plug-in female end and the plug-in male end is disposed at an inner bottom surface of the protection bracket, and the other is disposed at a bottom surface of the protection groove, wherein the protection groove and the protection bracket are configured for the p$^{th}$ protection bracket to be inserted into and matched with the p$^{th}$ protection groove to form a space to protect the plug-in female end and the plug-in male end, and at the same time for the p$^{th}$ plug-in male end to be inserted into the p$^{th}$ plug-in female to form a plug-in connection between the plug-in female end and the plug-in male end within the space formed by the p$^{th}$ protection groove and the p$^{th}$ protection bracket.

\* \* \* \* \*